US009944057B1

(12) United States Patent
Shaw et al.

(10) Patent No.: US 9,944,057 B1
(45) Date of Patent: Apr. 17, 2018

(54) ELASTOMERIC THERMO-MECHANICAL COMPENSATOR

(71) Applicant: Boral IP Holdings (Australia) Pty Limited, North Sydney (AU)

(72) Inventors: Brian Allen Shaw, Elmendorf, TX (US); Daniel Gomez, San Antonio, TX (US); Guy Lamar Crocco, New Braunfels, TX (US); Russ Kendal Majors, San Marcos, TX (US)

(73) Assignee: Boral IP Holdings (Australia) Pty Limited, North Sydney (AU)

( * ) Notice: Subject to any disclaimer, the term of this patent is extended or adjusted under 35 U.S.C. 154(b) by 437 days.

(21) Appl. No.: 14/622,338

(22) Filed: Feb. 13, 2015

(51) Int. Cl.
*B32B 37/10* (2006.01)
*B32B 37/24* (2006.01)
*B32B 38/18* (2006.01)

(52) U.S. Cl.
CPC .............. *B32B 37/10* (2013.01); *B32B 37/24* (2013.01); *B32B 38/18* (2013.01); *B32B 2433/02* (2013.01)

(58) Field of Classification Search
CPC ......... B32B 37/10; B32B 38/18; B32B 37/24; B32B 2433/02

USPC ........................... 156/64, 350, 351, 378, 379
See application file for complete search history.

(56) References Cited

U.S. PATENT DOCUMENTS

| 3,487,143 | A | 12/1969 | Bergvall |
| 3,656,360 | A | 4/1972 | Fix |
| 6,468,656 | B1 | 10/2002 | Beha |
| 6,843,744 | B2 | 1/2005 | Gregg et al. |
| 2010/0193114 | A1* | 8/2010 | Millar .................. B29C 70/443 156/245 |

* cited by examiner

*Primary Examiner* — Michael N Orlando
*Assistant Examiner* — Joshel Rivera

(57) ABSTRACT

Methods are disclosed of forming a joint between a relatively hardened strip of material, such as a molded and cured conveyor belt strip, and an adjacent material that is in the process of curing. The curing material shrinks during the curing process, pulling away from the edge of the relatively hardened strip. The method includes moving the relatively hardened strip of material toward the curing, adjacent material strip to compensate for the shrinkage. An apparatus, for example, grips the relatively hardened strip of material and maintains a constant pressure at the interface between the relatively hardened strip of material and the curing material strip while the latter cures and shrinks.

21 Claims, 8 Drawing Sheets

ELASTOMERIC THERMO-MECHANICAL COMPENSATOR

FIELD AND BACKGROUND

The application relates to apparatuses for moving a relatively hardened material strip relative to a semi-solid material strip and to related methods.

Current processes of making strips of material for industrial use, such as conveyor belts, may include pouring a liquid elastomer up against the end of a pre-formed strip segment. The joining of two ends of a strip to create a ring structure results in two cold joints. Strips are especially vulnerable to failure at this position. The location of the interface is known as a cold joint. During curing, the liquid elastomer—which is a thermoset polymer—undergoes shrinkage. This shrinkage causes the curing material to pull away from the formed material, resulting in a weaker joint that may fail under tension.

SUMMARY

Disclosed herein are methods of forming a joint between a relatively hardened strip of material and an adjacent strip of material that is in the process of curing. The curing material strip shrinks during the curing process, pulling away from the edge of the relatively hardened strip. The method includes moving the relatively hardened strip of material toward the curing, adjacent material strip to compensate for shrinkage. An apparatus, for example, grips the relatively hardened strip of material and maintains a constant pressure at the interface between the two strips of material during the curing process.

The apparatus for moving the relatively hardened material strip relative to a semi-solid material strip includes: an encasement configured to hold the semisolid material strip and the relatively hardened material strip, a driver adjacent the encasement, a driving mechanism able to move the relatively hardened material strip toward an end of the semi-solid material strip, and a driven clamp coupled to the driving mechanism and operable to grip the relatively hardened material strip.

The driving mechanism may include a base and a shuttle configured to move relative to the base. The driven clamp may be configured to secure the relatively hardened material strip to the shuttle.

The base may include an elongated portion, and the shuttle may slide in a longitudinal direction along the elongated portion of the base.

The driving mechanism may include a constant pressure mechanism with a cylinder. The driver may include a regulator configured to operate the cylinder. The cylinder may be an air cylinder, and the regulator may be an air pressure regulator.

The driven clamp may include a top plate, a bottom plate, and a compression mechanism configured to secure the relatively hardened material strip between the top plate and the bottom plate.

The bottom plate of the driven clamp may include an adapting mechanism configured to mate with the relatively hardened material strip. The adapting mechanism may be T-shaped.

The compression mechanism of the driven clamp may extend between the top and the bottom plates. The bottom plate or the top plate may include holes or slots, and the compression mechanism may extend from one plate to couple with the holes or slots on the other plate.

The top plate of the driven clamp includes a top surface and an axis running parallel to the top surface. The compression mechanism of the driven clamp may include a plurality of swing bolts attached to the top plate and configured to swing about the axis. The swing bolts may nest within a plurality of notches or slots on the bottom plate. They may also include threads and swing bolt nuts that are configured to tighten along the threads, applying a compression force between the top and bottom plates.

The encasement may include a wall structure and an encasement end. The wall structure may include a pair of elongate walls and a floor defining an elongate trough. The trough may be configured to hold the semisolid material strip and the relatively hardened material strip, and/or to act as a mold for the semi-solid material strip. The floor may include a surface configured to enable sliding of the relatively hardened material strip.

The apparatus may also include a sliding clamp that is removably attached to the encasement. The sliding clamp is spaced apart from the driven clamp. The sliding clamp comprises a sliding clamp body that is configured to exert a downward pressure on the relatively hardened strip while still allowing it to slide along the floor of the encasement. At least one sliding clamp guide may contact the sliding clamp body and direct longitudinal movement of the body relative to the encasement. The sliding clamp guide may be located on the top surface of the sliding clamp. The apparatus may also include a sliding clamp cover positioned both between and above a portion of the sliding clamp body The apparatus may include a sliding clamp connector that couples the sliding clamp body to the encasement. The connector may allow longitudinal sliding movement of the sliding clamp body relative to the encasement. The sliding clamp connector may include: a bottom crossbar that extends across an underside of the encasement perpendicular to its length, a top crossbar that extends across a top side of the encasement perpendicular to its length, a plurality of fasteners to secure the top crossbar to the bottom crossbar around the encasement, and beams extending from the top crossbar and for engaging the sliding clamp guide. The top crossbar may be configured to transmit pressure from the fasteners to the sliding clamp body.

The sliding clamp guide may be located between and removably attached to both the sliding clamp connector and the sliding clamp body. The sliding clamp guide defines an elongate path and elongate beams configured to nest within the elongate path. The top crossbar of the sliding clamp connector may attach to the sliding clamp guides.

A method of joining a relatively hardened material strip to a curing material may include: positioning a relatively hardened material strip adjacent a driver, placing a curing material into an encasement adjacent the relatively hardened material strip, activating the driver to initiate movement of the relatively hardened material strip toward the curing material, pushing the relatively hardened material against the curing material, thereby creating an interface between the relatively hardened material strip and the curing material, and maintaining a constant pressure at the interface of the relatively hardened material strip and the curing material during the curing process.

Placing the curing material further may also include pouring the curing material into the trough while in a relatively liquid state.

Positioning the relatively hardened material strip may also include clamping a front portion of the strip into the encasement using a sliding clamp, wherein the sliding clamp permits sliding of the strip along the length of the encasement.

Clamping a front portion further may include positioning a sliding clamp body over the front portion of the relatively hardened material strip, connecting the sliding clamp body to the encasement using a sliding clamp connector, and applying a downward force on the sliding clamp body.

Connecting the sliding clamp body further may also include positioning a top crossbar of the sliding clamp connector above the encasement and positioning a bottom crossbar of the sliding clamp connector beneath the encasement. Applying a downward force includes fastening the top and bottom crossbars together around the sides of the encasement.

The method may also include inserting elongate beams that extend perpendicularly from the top crossbar into elongate guides on the sliding clamp body.

The method may also include covering the sliding clamp. Covering the sliding clamp may include positioning one end of a cover between the sliding clamp body and the relatively hardened material and draping another end of the cover over the top of the sliding clamp body.

Positioning a relatively hardened material strip may also include clamping a back portion of the strip to the driver using a driven clamp.

Clamping a back portion of the relatively hardened material strip may also include positioning a top plate of the driven clamp above the back portion of the relatively hardened material strip and activating a compression mechanism to grip the back portion.

The method may also include indexing the material strip.

Clamping a back portion of the relatively hardened material strip may include positioning the relatively hardened material strip between a top plate and a bottom plate of the driven clamp and activating a compression mechanism to grip the back portion between the top plate and the bottom plate.

Positioning the relatively hardened material strip between the top plate and the bottom plate may include fitting the relatively hardened material strip to a T-shaped adaptor on the bottom plate.

Activating the compression mechanism may include tightening swing bolts around the top plate and the bottom plate of the driven clamp.

Activating the driver may include activating a driving mechanism by initiating a fluid flow. The driving mechanism may be an air cylinder and the fluid may be air.

The method may also include testing a hardness of the curing material, and activating the driver once the curing material reaches a predetermined hardness.

Pushing the relatively hardened material strip toward the curing material may be achieved via the shuttle that moves longitudinally along a base of the driver. The relatively hardened material strip may be removably connected to the shuttle.

BRIEF DESCRIPTION OF THE DRAWINGS

Like reference symbols in the various drawings indicate like elements.

DETAILED DESCRIPTION

The disclosure can be understood more readily by reference to the following detailed description, examples, drawing, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. The terminology used herein is for the purpose of describing particular aspects only and is not intended to be limiting.

Disclosed herein are apparatuses for moving a relatively hardened material strip toward a semi-solid material strip to compensate for shrinking of the latter during curing.

Figure 4A:
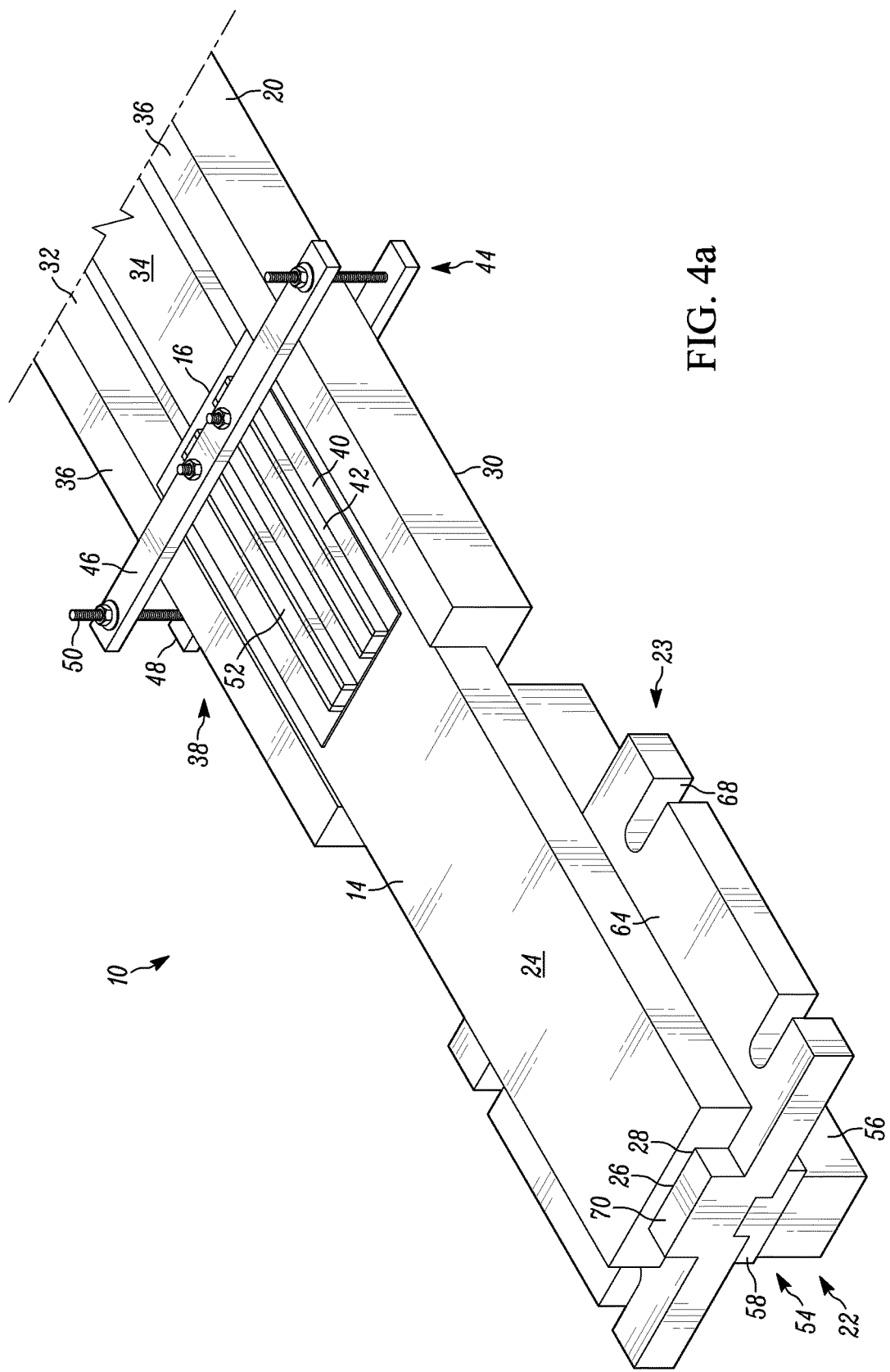
FIG. 4a shows a perspective, partially assembled view of a the compensator of FIG. 1 including a driver.
Figure 4B:
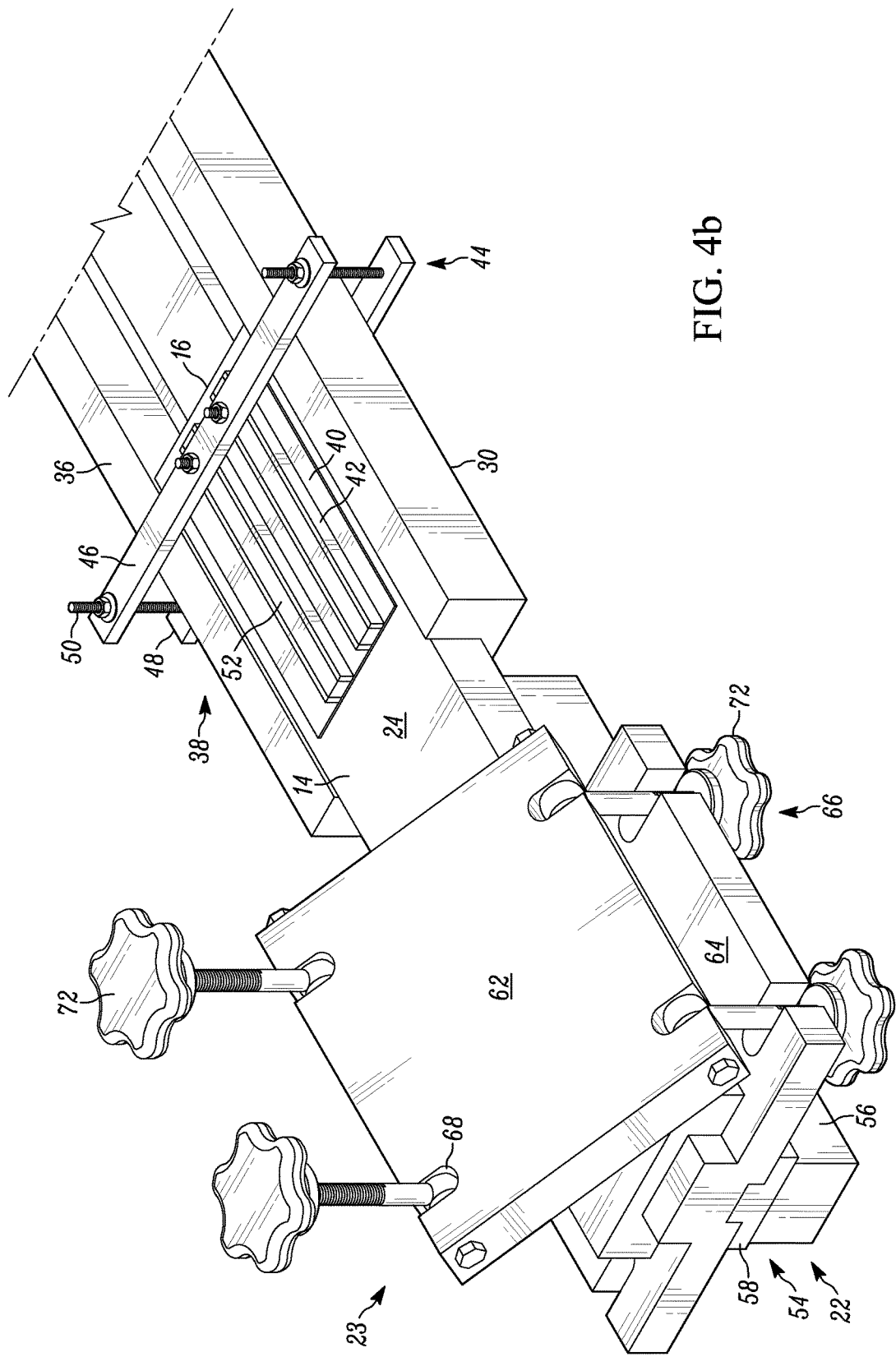
FIG. 4b shows a perspective view of assembly of a driving clamp of the compensator of FIG. 1.
Figure 4C:
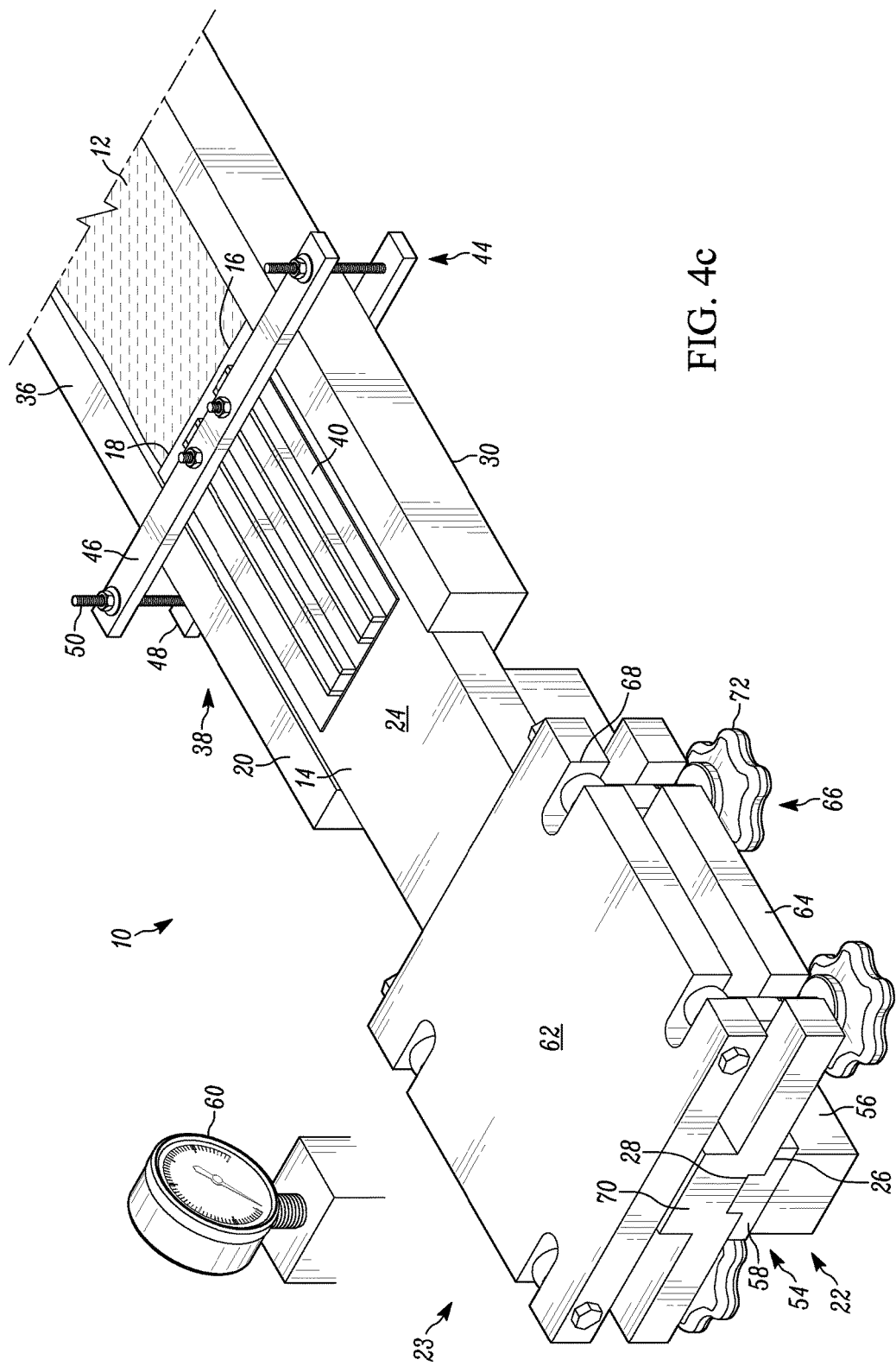
FIG. 4c shows a perspective view of the strip-forming system of FIG. 1 with a liquid material poured into a mold or encasement.
Figure 4D:
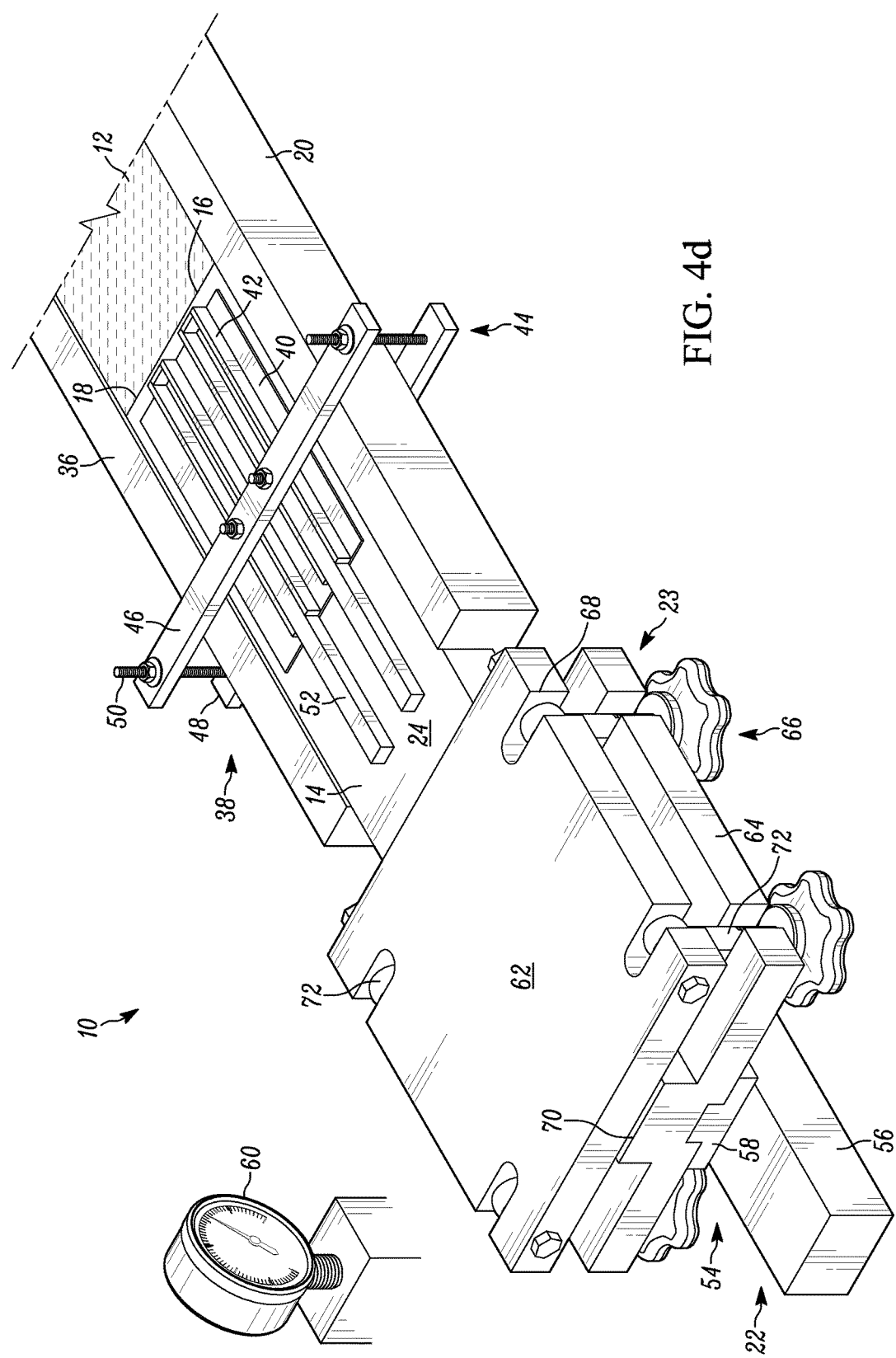
FIG. 4d shows a perspective view of the compensator apparatus of FIG. 4c advancing (in an exaggerated manner) the free end of the relatively cured strip toward the less cured strip material.
Figure 5:
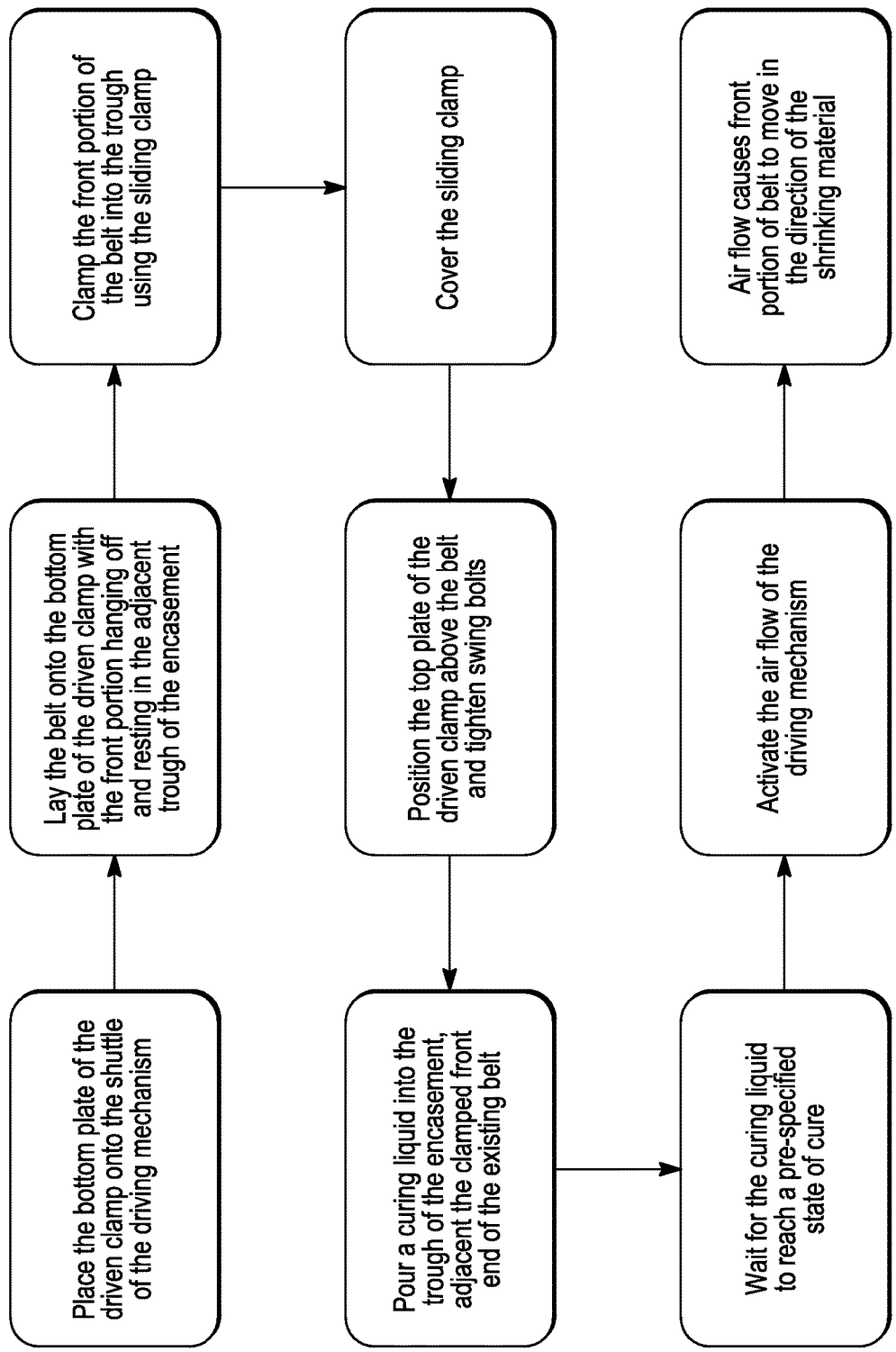
FIG. 5 shows a flow chart of a method of forming a joint between a relatively hardened strip of material and an adjacent strip of material that is in the process of curing.

FIGS. 4c and 4d show, for example, an apparatus 10 for adjusting the position of an end 16 of a relatively hardened material strip 14 relative to an end 18 of a curing, semi-solid material strip 12. The apparatus 10 includes an encasement 20, a driver 22 and a driven clamp 23. Advantageously, the driver 22 can drive the driven clamp 23, which is secured to the end 16 of the relatively hardened material strip 14, toward the free end 18 of the semi-solid material strip 12 curing in the encasement 20. In this manner, the apparatus 10 forms the strips 12, 14 while maintaining contact between their free ends 16, 18. And, the strips 12, 14 attach (or can be attached) to form a relatively longer strip.

The term strip, as used herein, refers to an elongate length of material that has a length at least 1, 2, 3 or more times its width. A strip may be used, for example, to convey movement or power, such as a conveyor belt. Such material strips, when formed of a material that contracts as it cools as a result of thermal shrinkage or crosslinking (such as a thermoset polymer including but not limited to polyurethane and polyurea), experience relatively large displacements at the free ends due to this shrinkage. Many thermoset materials exhibit this behavior. Shrinkage may be on the range of 0-5%, or more commonly, 0-2%.

It is possible, however, for the apparatus 10 to be used with other material shapes and compositions. For example, wood, carpeting or other materials may advantageously have edges advanced into an abutting relationship for fastening, installation or further processing.

In the illustrated implementation, a strip is being formed in several sections using the encasement 20. The relatively hardened material strip 14 in FIG. 3 has a channel shape with a flat top surface 24 and a bottom surface 26. Defined along the length of the bottom surface 26 is a channel 28. Generally, however, the strip can have any extruded or molded cross-sectional shape particularized to its function, such as a rectangular, irregular or other shape. In FIG. 4c, the right hand side shows the semi-solid material strip 12 with a pattern of dashed fill.

Generally, in one implementation, the relatively hardened strip is approaching (within 5%) its final hardness while the newly poured strip has to be cured to a shore A 20 hardness or greater. Otherwise, the gel-like, semi-solid strip 12's end 18 will begin being deformed in an undesirable way. This threshold can vary, however, depending upon material composition—with shore A of 20 being generally applicable to thermoset polymers used in strips.

Forming the new strip end 18 against the old strip end 16 creates a "cold joint." The cold joint is the location with the liquid elastomer is poured up against the end of the solid formed strip, thereby extending the total length of the strip. Generally, once an adequate length is achieved by casting several sections, a final casting joins both ends of the strip—thus forming two cold joints in one pour and closing the loop. When curing, however, the shrinkage of the newly poured strip can generate sufficient force as to cause the cold joint to pull apart or become weakened.

Figure 3:
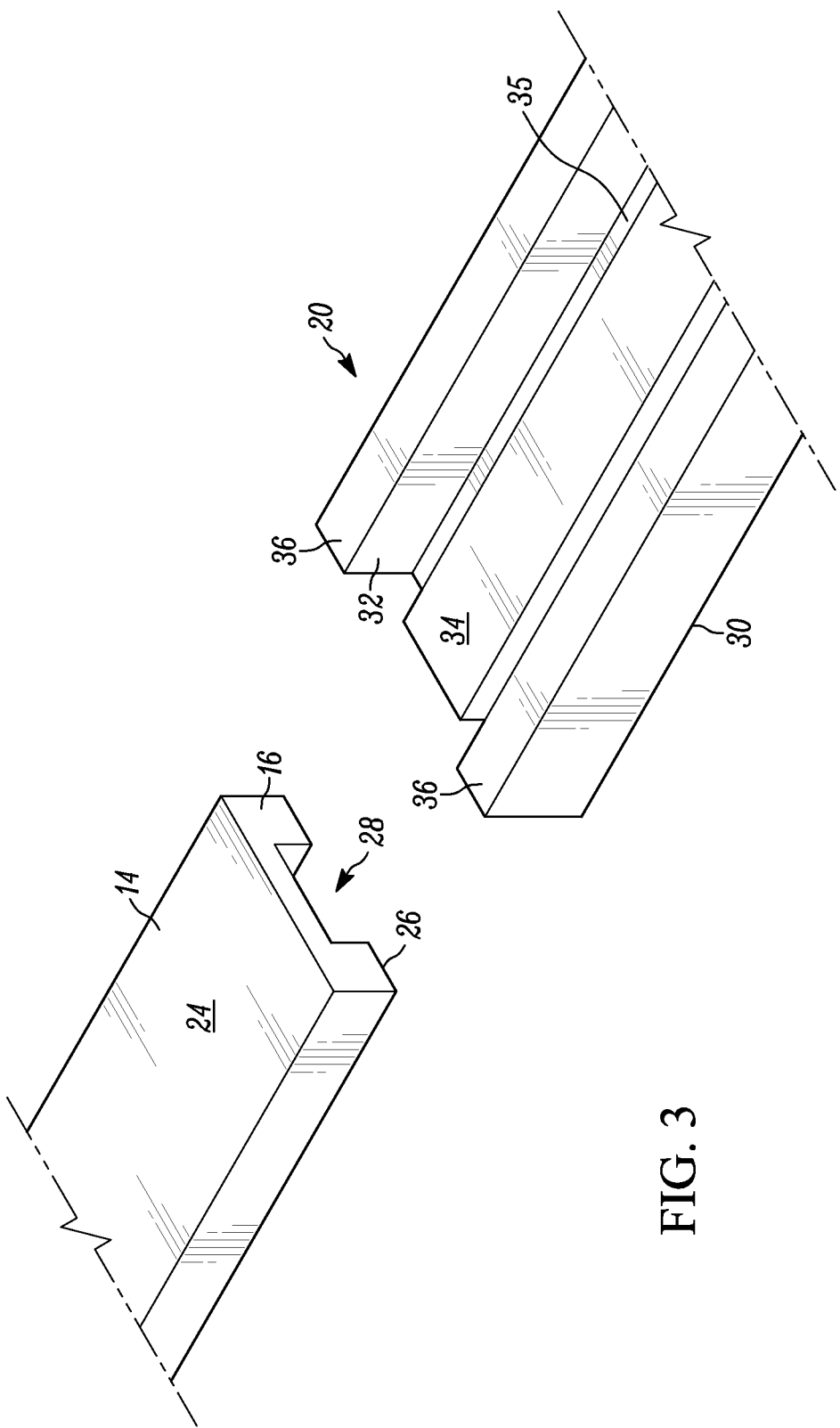
FIG. 3 shows an exploded, perspective view of a semi-solid strip of material separated from an encasement of the system of FIG. 1.

The encasement 20, as shown in FIG. 3, has a wall structure forming t-shaped cross-section (to form the illustrated implementation of the strip's cross-section with the channel 28) with a bottom surface 30 and a top surface 32. The top surface 32 has the negative shape of the bottom surface 26 of the strip. The encasement includes a pair of walls 36 forming a central channel 35. Within the central channel 35 is a central plateau 34 that forms, during the molding process, the rectangular channel 28 in the strip. It's worth noting that the central channel may take other shapes. For example, the central plateau may be absent, or the channel may curve upward to create a strip with a curved underside.

The encasement 20 may also include a top plate that can extend over and form the flat top surface 24 of the strip or the liquid itself may form a relatively planar flat surface. During use, a downstream portion of the encasement 20 receives the end 16 of the old, relatively hardened strip 14 after it is peeled from the upstream portion of the encasement. In particular, the hardened strip 14 is lifted out, shifted along the length of the encasement 20 to have most of its length wrap around and under the end of the table supporting the encasement. (The surface of the encasement 20 may be finished and/or lubricated to facilitate sliding within the walls 36.) The free end 16 of the relatively hardened strip 14 is indexed into position to be adjacent the new strip 12 as it is poured between the walls 36 and over the plateau 34 for forming into the semi-solid material strip 12.

The term index or indexing as used herein refers to the processing of stripping the relatively cured strip out of the encasement mold, wrapping the strip around the end of the mold, back under the length of the mold, and then positioning the leading end 16 adjacent the mold encasement 20.

Figure 1:
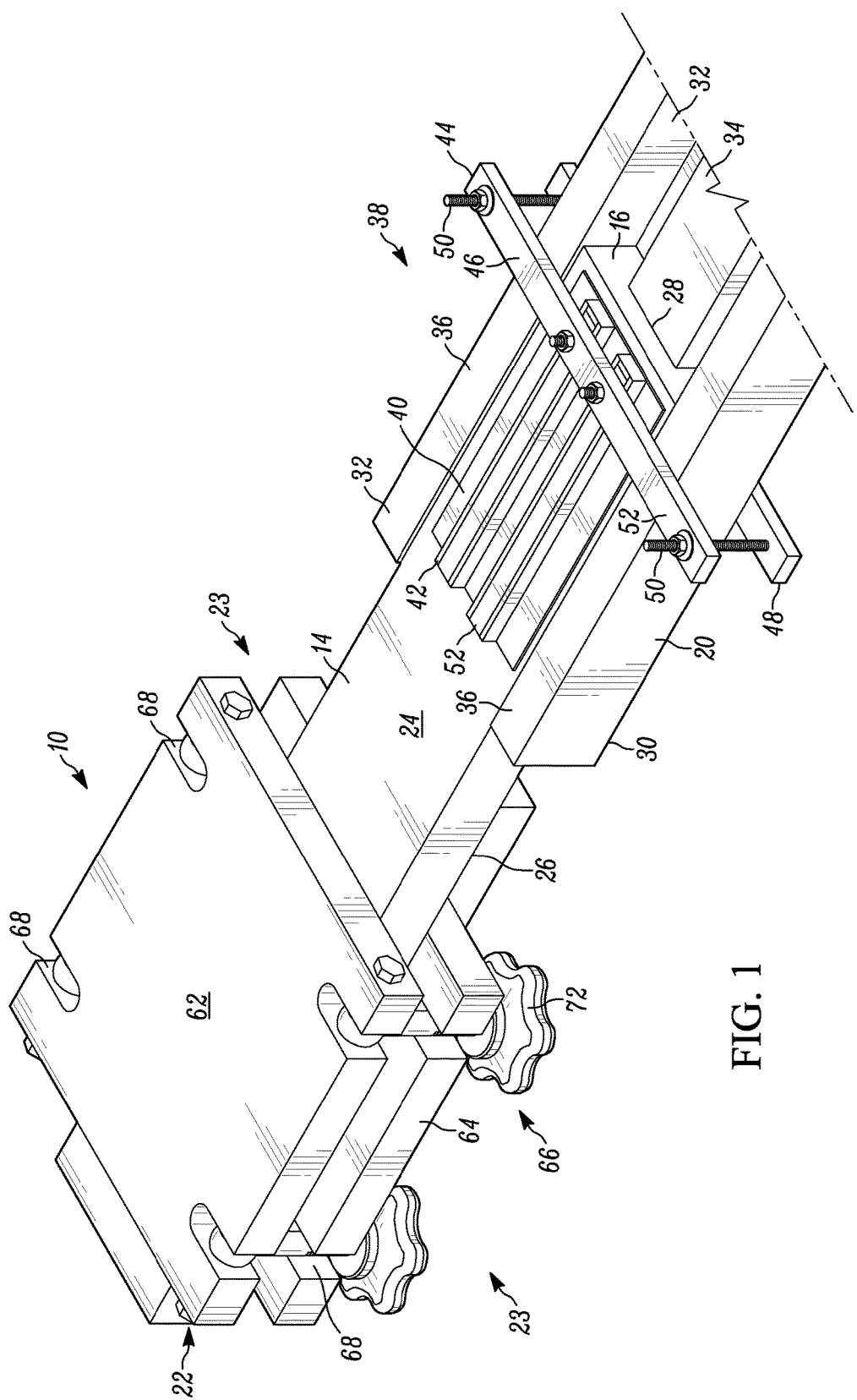
FIG. 1 shows a perspective view of a strip-forming system of one implementation, including a compensator apparatus for adjusting the relative positioning of one strip of material that is relatively more advanced in its curing than an adjacent, semi-solid strip of material.
Figure 2:
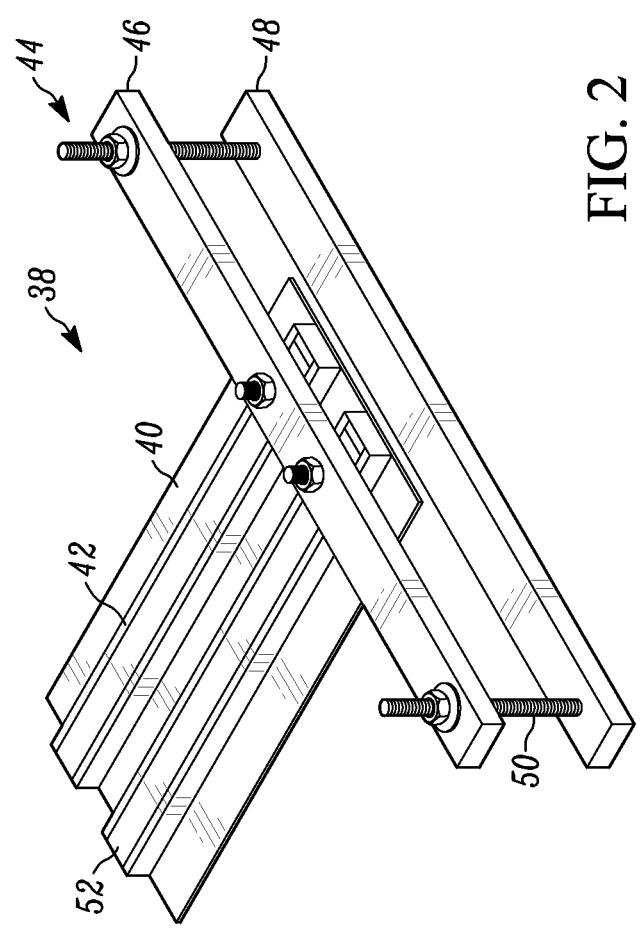
FIG. 2 shows a perspective view of components of a sliding clamp of the compensator shown in FIG. 1.

Referring to FIGS. 1 and 2, the encasement 20 may include (or it may be a separate assembly) a sliding clamp assembly 38. The sliding clamp assembly 38 may include a clamp body 40, guides 42 and a connector 44. The clamp body includes a plate or other structure that can exert a downward force on the relatively hardened strip 14. An additional cover may be placed under the plate 40 for additional friction and compression of the strip, and to prevent curing material from contacting the components of the sliding clamp assembly. The body may also be considered to include the encasement trough—which together hold the strip 14 therebetween.

Two of the guides 42 are mounted to the top of the clamp body 40. They are configured to direct longitudinal movement of the sliding clamp body relative to the encasement, as shown in FIGS. 4c and 4d. The clamp guides 42 form a channel that is elongate in the direction of travel of the strip.

The sliding clamp connector 44 includes a top crossbar 46, a bottom crossbar 48 and fasteners 50. The top crossbar 46 extends across a top side of the encasement, perpendicular to the length of the encasement. The bottom crossbar 48 extends across an underside of the encasement 20, perpendicular to its length. The middle of top cross-bar 46 supports a pair of beams 52 that are configured to each slide within the channel of a respective one of the guides 42.

The fasteners 50, such as various bolts secured with nuts, extend between the crossbars 46, 48 to clamp them to the encasement 20. The fasteners extend, in particular, outside the encasement between overhanging free ends of the crossbars 46, 48. The beams are attached to the underside of the top crossbar 46 and the downward force of the top crossbar similarly compresses the beams and the top plate body 40. This applies the downward force to the relatively hardened strip 14, while at the same time allowing the strip to slide in the long direction of the encasement 20's channel defined by the walls 36.

Advantageously, the downward clamping pressure on the relatively hardened strip 14 helps to keep freshly poured material forming into the semi-solid strip 12 from leaking under the end 16. Also, the grain of the two strips match up as the second forming strip begins to solidify.

It should be noted, that the sliding clamp assembly 38 function may be accomplished by other structure. Generally, the sliding clamp assembly need only assist in keeping the leading end 16 of the hardened material strip 14 ensconced in the encasement 20, while at the same time allowing translation for indexing and/or adjustment to compensate for shrinkage. Also, alternatively, the apparatus 10 may not even need the sliding clamp assembly 38 and instead could rely on the driver 22 and driven clamp 23 combination to secure and advance the relatively hardened strip 14.

Referring to FIG. 4d, the driver 22 is positioned adjacent the encasement 20 and includes a driving mechanism 54 which is coupled to the driven clamp 23. Generally, the driven clamp 23 grips the relatively hardened strip 14 so that the driver 22 can move the strip toward the end 18 of the semi-solid strip 12 as the latter shrinks during curing.

The driving mechanism 54 may further include a base 56 and a shuttle 58. The base 56 in FIG. 4d is shown schematically as an elongate rectangular member extending under the shuttle 58 in the long direction of the strips 12, 14. The base 56, in addition to providing support for the shuttle 58, may house various driving mechanism components, such as a cylinder or other mechanical/electromechanical (e.g., motor and screw with PLC) assembly configured to advance and retract the shuttle 58. For example, as shown in FIG. 4c, the driving mechanism may be driven by an air cylinder with an air pressure regulator indicated schematically by pressure gauge 60.

The shuttle 58 slides along the length of the base 56 as urged by the cylinder or other driving force generator. The shuttle 58 is attached to and supports the underside of the driven clamp 23. The shuttle 58 can have a length of travel from its starting position in the direction of the semi-solid, forming strip 12 that equals or exceeds the expected shrinkage. This facilitates the shuttle 58, and the supported driven clamp 23, and the hardened strip 14's ability to keep up with the shrinkage of the forming strip 12.

An advantage of using a compressible fluid filled cylinder is that the driving mechanism 54 can operate with a constant pressure. The pressure amount can be adjusted to generate the force needed to exceed resistance to sliding movement of the relatively hardened strip 14 plus some overage (e.g., about 5 psi) to maintain pressure at the interface of the two ends 16, 18 of the strips. The amount of pressure necessary to overcome the static resistance of the relatively hardened strip 14 may be reduced by the addition of a mold release or lubricating material to the encasement 20. This could be applied, for example, prior to moving the relatively hardened material strip 14 into the encasement. For the illustrated implementation, the total force of overcoming static plus an additional overage is about 30-35 psi on the cylinder. For a cylinder with a bore of 2.5 inches, this translates to 140-180 pounds of force, or more specifically, 145-172 pounds of force.

The driven clamp 23 is used to grip the relatively hardened strip 14 with enough force to allow it to be urged in the direction of the curing strip 12. To this end, it has a shape adapted to fit and grip at least a portion of the cross-sectional shape of the relatively hardened strip 14. For example, as shown in FIGS. 4b, 4c and 4d, the driven clamp may include a top plate 62, a bottom plate 64 and a compression mechanism 66. The top plate 62 has a rectangular shape with long edges or sides extending in the direction of strip travel. The top plate 62 has defined notches or slots 68 in its long sides—two per side. The top plate 62 has a planar undersurface that conforms to the planar surface of the top of the strip 14. Its shape, however, could be adapted to other strip shapes, such as by being curved or having a pattern.

The bottom plate 64 is generally rectangular with long sides extending in the strip direction. The bottom plate 64 also has a top surface shaped similar to the central channel 35 of the encasement. The bottom plate 64 includes its own plateau 70 that forms it into a T-shaped adapting mechanism (the cross-section or end view of the bottom plate is generally T-shaped). The bottom plate, however, lacks the walls 36 of the encasement since it is not serving as a mold like the encasement 20. The shape of the top surface of the bottom plate 64 conforms to the underside channel 28 of the strip 14. This helps alignment of the strip 14 with the driven clamp 23 for indexing and compensation movement. The bottom plate 64 also has a bottom surface with a notch that facilitates attachment to the shuttle 58. Further, the bottom plate may include slots 68—a pair on each of long sides of the bottom plate 64.

It's worth noting that the adapting bottom plate 64 takes the shape of the internal encasement mold surface. Therefore, the adapting bottom plate 64 could or would be adapted to the shape of different material strip shapes, such as different strip cross-sectional shapes. A strip shape of a simple rectangle (rather than the T-shape) could use a simple flat top surface. A strip with a curved underside would be supported with a conforming positive shape on the top surface of the adapting plate.

The compression mechanism 66 can be any assembly that helps to urge the plates 62, 64 together to grip the relatively hardened strip 14 for indexing and compensation movement. The compression mechanism 66, for example, can include four fasteners, such as swing bolts 72, extending within the slots and between the plates. The swing bolts 72 may be pivotally mounted to the top plate 62 and, when secured, are nested within the respective slots 68. In this manner, the swing bolts can be loosed at the bottom plate 64 and then swing out and up along an axis that is parallel to, and extends in the long direction of, the surface of the top plate 62. Pivotability thus takes the swing bolts into position for easy grasping and removal of the top plate 62, as shown in FIG. 4b.

Each of the swings bolts 72 includes threads and flanged nuts on their non-pivoted ends. The flanged nuts have an easily gripped contour for manual loosening and tightening. Thus, a user can easily swing the flanged nuts into place under the bottom plate 64, with the shafts of the bolts extending within the slots 68, and then hand tighten the flanged nuts to grip the relatively hardened strip 14.

A method of one implementation includes positioning the relatively hardened material strip 14 to have its end 16 within the encasement 20, as shown in FIG. 4a. As described above, this is part of the indexing process. (Prior to this, the material will have been stripped out of the mold (encasement 20), wrapped around the end of the encasement and back under its length.)

The method also includes pouring the liquid polymer material into the encasement 20, as shown in FIG. 4c. The material is flowed up to the end 16 of the relatively hardened material strip and begins to form the semi-solid material strip 12.

The method also includes activating the driver 22 to move the relatively hardened strip 14 toward the curing, semi-solid material strip 12, as shown in FIG. 4d. This step may be preconditioned by the strip 12 reaching a certain state of cure, such as by having a shore A hardness of 20 or greater.

As the semi-solid material strip begins to cure and shrink, the method includes pushing the relatively hardened, semi-solid material. Thus, the method includes creating an interface between the relatively hardened material strip 14 and the curing semi-solid material 12. For strips and similar materials, this is the beginning of a cold joint. And, as the curing continues, the method includes maintaining a constant pressure at the interface. Thus, the relatively hardened material strip 14 may be continuously advanced to compensate for the shrinkage of the material strip 12 as it cures and contracts.

The method may also include clamping a front portion (adjacent the end 16) of the strip into the encasement 20 using the sliding clamp assembly 38, as shown in FIG. 4b. For example, the user positions a sliding clamp body 40 over the front portion of the relatively hardened material strip 14, connects the sliding clamp body to the encasement using connector assembly 44 and applies a downward force on the sliding clamp body. For example, this could be part of a strip indexing process. Connecting the sliding clamp body 40 may include positioning the crossbars 46, 48 above and below the clamp body and encasement, respectively. Then, attaching fasteners 50 at the ends of the crossbars and applying a downward force by tightening the connectors.

The positioning step may also include clamping a back portion (positioned opposite the end 16, on the other side of the front portion) of the hardened material strip 14 to the driver 22 using a driven clamp 23. Clamping the back portion can include positioning the top plate 62 of the driven clamp 23 above the back portion and activating the compression mechanism 66.

Activating the compression mechanism can include tightening a plurality of swing bolts 72 extending between the top plate 62 and bottom plate 64.

Pushing the relatively hardened material strip 14 may include using air to move a shuttle 58 attached to the bottom plate 64.

For a strip application, the material strips can be 60 feet long to make up a 180 foot strip in a closed loop. A first 60 foot length is molded and cured, then indexed. Once relocated, the first 60 foot long strip is now the relatively hardened material strip 14. A second 60 foot strip is poured and the cold joint formed using the apparatus 10. The strip is then long enough to wrap around the encasement 20. Two of the compensation assemblies are then employed, one at each end of the third strip section as it is poured and cured to form two cold joints contemporaneously. Generally, each joint is formed in about 30 minutes to an hour.

The apparatuses and methods described herein have many advantages. The compensation motion is sufficient to adjust for any shrinkage the cast thermoset may exhibit thereby keeping the lateral force across the newly cast joint either consistent, or under slight compression. As such, the joint does not experience tension forces during curing, which are known to be detrimental to the durability of the cold joint. Historically, any attempt (internal or external) to make a cast strip likely resulted in premature cold joint failure. At times, cold joint failure results in greater than a 90% reject rate, including catastrophic failure and premature failure. The inventors have been able to reduce the reject rate for cold joint failures to below 5%.

Another advantage is that mechanical, rather than chemical, means are being used to address the shrinkage. Implementations can, for example, compensate for shrinkage due to variation in reactivity resulting from changes in formulation of the elastomer, catalysts changes, casting temperature or ambient conditions. The amount of pressure applied across a joint can be maintained to a consistent value, regardless of travel, using air or other compressible liquids to power the driver. Ultimately, this provides a means to greatly improve the integrity of the cold joints.

The apparatuses and methods of the appended claims are not limited in scope by the specific apparatuses and methods described herein, which are intended as illustrations of a few aspects of the claims and any apparatuses and methods that are functionally equivalent are intended to fall within the scope of the claims. Various modifications of the apparatuses and methods in addition to those shown and described herein are intended to fall within the scope of the appended claims. Further, while only certain representative apparatuses and methods disclosed herein are specifically described, other combinations of steps, elements, components, or constituents are also intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed.

The invention claimed is:

1. A method of joining a relatively hardened material strip to a curing, semi-solid material, the method comprising;
   positioning a relatively hardened material strip adjacent a driver,
   placing a curing, semi-solid material adjacent the relatively hardened material strip,
   activating the driver to initiate movement of the relatively hardened material strip toward the curing, semi-solid material,
   pushing the relatively hardened material strip against the curing, semi-solid material, thereby creating an interface between the relatively hardened material strip and the curing, semi-solid material,
   maintaining a constant pressure at the interface of the relatively hardened material strip and the curing, semi-solid material.

2. The method of claim 1, wherein placing the curing, semi-solid material further comprises pouring a curable, liquid material into a trough.

3. The method of claim 1, wherein positioning the relatively hardened material strip further comprises clamping a front portion of the strip using a sliding clamp, wherein the sliding clamp permits sliding of the strip.

4. The method of claim 3, wherein clamping a front portion further comprises positioning a sliding clamp body over the front portion of the relatively hardened material strip, and applying a downward force on the sliding clamp body and the relatively hardened material strip using a sliding clamp connector.

5. The method of claim 4, wherein applying a downward force further comprises positioning a top crossbar of the sliding clamp connector above the relatively hardened material strip, positioning a bottom crossbar of the sliding clamp connector beneath the relatively hardened material strip, and wherein applying a downward force includes fastening the top and bottom crossbars together around the sides of the relatively hardened material strip.

6. The method of claim 5, wherein the top crossbar contacts the sliding clamp body.

7. The method of claim 5, wherein the top and bottom crossbars are perpendicularly positioned to the length of the relatively hardened material strip.

8. The method of claim 5, wherein the fasteners are sliding clamp bolts and sliding clamp nuts.

9. The method of claim 5, wherein the sliding clamp body further comprises elongate guides, the top crossbar further comprises elongate beams which extend perpendicularly from the crossbar, and wherein the method further comprises sliding the elongate beams along the elongate guides of the sliding clamp.

10. The method of claim 4, further comprising covering the sliding clamp.

11. The method of claim 10, wherein covering the sliding clamp further comprises positioning one end of a cover between the sliding clamp body and the relatively hardened material strip.

12. The method of claim 11, wherein the step of positioning a relatively hardened material strip further comprises clamping a back portion of the relatively hardened material strip to the driver using a driven clamp.

13. The method of claim 12, wherein the driven clamp further comprises a compression mechanism, and clamping a back portion of the relatively hardened material strip comprises positioning a top plate of the driven clamp above the back portion of the relatively hardened material strip and activating the compression mechanism to grip the top plate.

14. The method of claim 12, further comprising indexing the relatively hardened material strip.

15. The method of claim 12, wherein the driven clamp further comprises a compression mechanism, and clamping a back portion of the relatively hardened material strip comprises positioning the relatively hardened material strip between a top plate and a bottom plate of the driven clamp and activating a compression mechanism to grip the back portion between the top plate and the bottom plate.

16. The method of claim 15, wherein the bottom plate comprises a T-shaped adaptor and positioning the relatively hardened material strip between the top plate and the bottom plate further comprises fitting the relatively hardened material strip to the T-shaped adaptor.

17. The method of claim 15, wherein the compression mechanism comprises a plurality of swing bolts, and activating the compression mechanism comprises tightening the swing bolts around the top plate and the bottom plate of the driven clamp.

18. The method of claim 1, wherein the step of activating the driver comprises activating a driving mechanism by initiating a fluid flow.

19. The method of claim 18, wherein the driving mechanism is an air cylinder and the fluid is air.

20. The method of claim 1, further comprising testing a hardness of the curing, semi-solid material, and wherein the step of activating the driver occurs once the curing, semi-solid material reaches a predetermined hardness.

21. The method of claim 1, wherein the driver comprises a base and a shuttle configured to move longitudinally along the base, the relatively hardened material strip is removably connected to the shuttle, and the step of pushing the relatively hardened material strip toward the curing, semi-solid material is achieved via the shuttle.

* * * * *